United States Patent [19]

Johnson

[11] Patent Number: 4,533,167
[45] Date of Patent: Aug. 6, 1985

[54] ROBOTICS MANIPULATOR WITH GRIPPING FORCE CONTROL MEANS

[75] Inventor: Robert G. Johnson, Minnetonka, Minn.

[73] Assignee: Honeywell Inc., Minneapolis, Minn.

[21] Appl. No.: 579,614

[22] Filed: Feb. 13, 1984

[51] Int. Cl.³ .............................................. B25J 15/02
[52] U.S. Cl. .................................. 294/86.4; 294/907; 901/32; 901/34
[58] Field of Search ............ 294/1 R, 86 R, 88, 99 R, 294/103 R, 104, 106, DIG. 2; 73/196, 861.52, 861.53, 861.61; 414/1, 4, 5; 901/30-39, 46, 50

[56] References Cited

U.S. PATENT DOCUMENTS

| | | | |
|---|---|---|---|
| 3,168,203 | 2/1965 | Gallistel | 901/34 X |
| 3,449,008 | 6/1969 | Colechia | 294/88 |
| 3,759,092 | 9/1973 | Fishel | 901/34 X |
| 4,001,556 | 1/1977 | Folchi et al. | 901/35 X |

FOREIGN PATENT DOCUMENTS

| | | | |
|---|---|---|---|
| 153602 | 1/1982 | Fed. Rep. of Germany | 294/86 R |
| 624789 | 9/1978 | U.S.S.R. | 294/99 R |
| 633726 | 11/1978 | U.S.S.R. | 901/32 |
| 662344 | 5/1979 | U.S.S.R. | 901/32 |

OTHER PUBLICATIONS

*Electronics*, Nov. 17, 1983, pp. 119–121, "Piezoelectric Substances, Strain Gages, and Other Sensors Give Robots a Feel for the Job".

*Primary Examiner*—Johnny D. Cherry
*Attorney, Agent, or Firm*—Alfred N. Feldman

[57] ABSTRACT

A robotics manipulator utilizes a fluid pressure control system to provide a response to the gripping force of the robotics manipulator on an object. The force is converted to a change in fluid pressure that is sensed in a fluid flow channel. This change in pressure or flow is in turn used to provide the control system for the robotics manipulator with information on how hard an object is being gripped.

16 Claims, 3 Drawing Figures

ROBOTICS MANIPULATOR WITH GRIPPING FORCE CONTROL MEANS

BACKGROUND OF THE INVENTION

The use of robotics manipulators has increased drastically over the last few years. For these manipulators to be useful and effective, some means must be provided so that the force being exerted by the manipulator can be sensed and/or controlled.

Many different approaches have been taken to provide the sensing function required for control of the robotics manipulators. These expedients include strain gauges, closed hydraulic systems, hydraulic systems which include pressure sensors, and systems which measure the input force to the manipulator.

The systems in use today tend to be rather complex and costly. In order to make widespread use of robotics, some form of simple, reliable, and inexpensive control systems are necessitated.

SUMMARY OF THE INVENTION

The present invention is directed to a robotics manipulator arrangement that utilizes a fluid pressure source means, typically a pneumatic source, a simple transducer responsive either to pressure or flow, and a variable fluid flow restriction means with this restriction means variable in response with respect to a gripping force. The force is generated by the robotics manipulator gripping an object and varying the restriction means so that a changing fluid pressure can be sensed and used for control purposes.

In its very simplest form, the present invention is directed to a pneumatic control system that has an orifice which is surrounded by a pad of material which acts as a variable restriction as part of a gripping system. As force is exerted on an object, the pliable material is compressed and an increase in pressure is generated in a flow channel between the pneumatic source and the orifice. This change in flow and/or pressure is sensed by small, solid-state type sensors now readily available. These sensors then convert the change to an output that is fed back to the control system for the overall manipulator.

The variable fluid flow restriction means can be structured in numerous ways. The simplest structure is an orifice surrounded by a pliable material. This could be supplemented by the placement of a spring in the pliable material to change its characteristics. Further, the pliable material could be of a porous type wherein the pores of the material would vary, in a very finely controlled manner, the flow of air through the restriction means. It further would be possible to structure the present device utilizing a variable fluid flow restriction means that for all practical purposes is obstructed when no force is present. The flow restriction means could be opened or increased in air flow capacity as an object is gripped thereby reducing the pressure in a supply channel. Many variations of the present system would be possible.

In accordance with the present invention, there is also provided a robotics manipulator having a control system allowing said manipulator to be controlled with respect to a gripping force on an object, including: robotics manipulator means having at least two members that move relative to each other to provide a gripping force at a predetermined location; said manipulator means including control means; fluid pressure source means including connection means connected to fluid channel means; said fluid channel means having opening means in at least one of said two members near said predetermined location; variable fluid flow restriction means attached to said manipulator means with said variable fluid flow restriction means changing in fluid flow restriction characteristics as said two members increase said gripping force at said predetermined location upon said manipulator means gripping said object; said fluid flow restriction means changing the fluid flow and changing a fluid condition in said fluid channel means; transducer means responsive to said changing fluid condition in said channel means; and said transducer means connected to said manipulator control means to feed back a signal indicative of said gripping force.

DESCRIPTION OF THE PREFERRED EMBODIMENT

Figure 1:
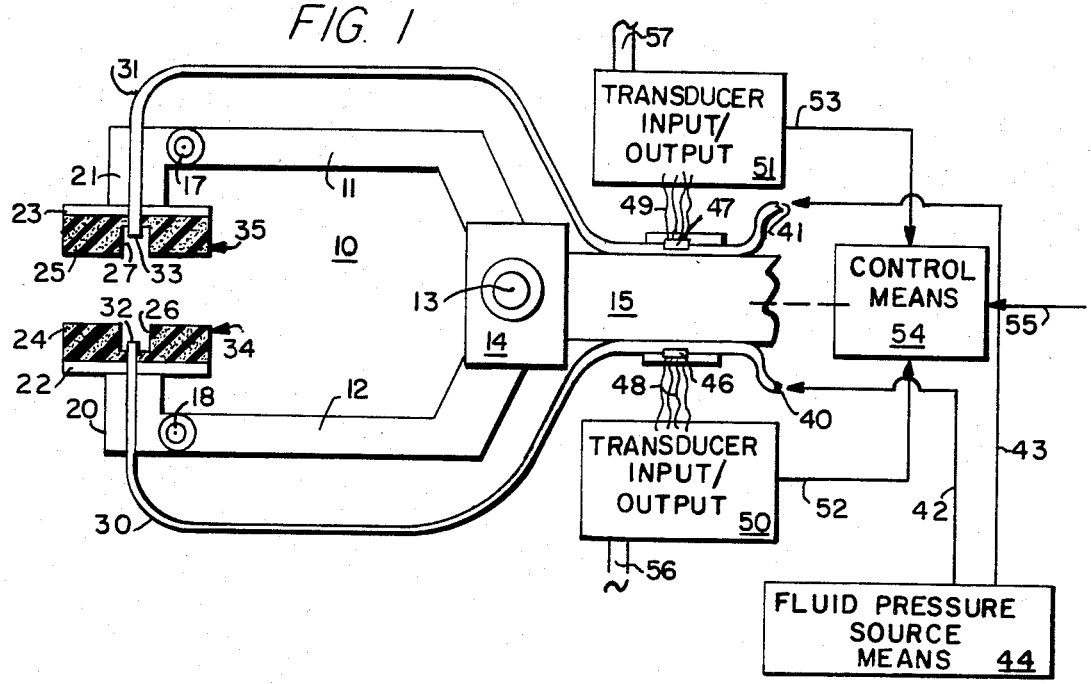
FIG. 1 is a representation of a robotics manipulator and control system.

In FIG. 1 a robotics manipulator is generally disclosed at 10. The manipulator 10 includes a pair of arms 11 and 12 which are pivoted at 13 and operated by a mechanism 14 which can be any convenient type. The mechanism 14 could be hydraulic, electric, or mechanical and includes such elements as gears, levers, and motors. The mechanism 14 is controlled through an arm or member 15 and the contents of the arm 15 and the member 14 are not material to the present invention, but are well known in the robotics art.

The arms 11 and 12 have pivot means 17 and 18. Each of the pivot means 17 and 18 allow free movement of a pair of fingers 20 and 21. In some cases, the fingers 20 and 21 would be made integral with the arms 11 and 12, eliminating the need for the pivotal joints or means 17 and 18. Also, it is apparent that one of the two arms 11 or 12 could be fixed in relation to the member 14, with only the other arm moving. The only requirement of the robotics manipulator 10 is that the fingers 20 and 21 are capable of being moved towards and away from each other under the control of the member 15 (and a control system to be described).

Abutting the ends of fingers 20 and 21 are a pair of plates 22 and 23 that support a pair of pliable pads 24 and 25 that have central openings 26 and 27. Centered in each of the openings 26 and 27 are a pair of pipes or fluid channel means 30 and 31, which have ends 32 and 33. The ends 32 and 33 along with the recesses 26 and 27 of the pads 24 and 25 form variable fluid flow restriction means that have been generally indicated at 34 and 35. The two variable fluid flow restriction means 34 and 35 are adapted to clamp or grip an object. It is quite apparent that if an object, such as a flat plate, is placed between the variable fluid flow restriction means 34 and 35, that as the variable fluid flow restriction means 34 and 35 come together that any fluid flowing from the ends 32 and 33 will be constricted. This will raise the fluid pressure in the pipes or fluid channel means 30 and 31.

The pipes or fluid channel means 30 and 31 extend back to the member 15 and then are connected at 40 and 41 to pipes 42 and 43 to a fluid pressure source means disclosed at 44. The fluid pressure source means 44 could be a pneumatic source, could be a pneumatic source when the present device is used in a fluid environment such as water, or could be a source of fluid pressure, such as water, if the manipulator means 10 is used under water. Also, the present fluid pressure source means could be any fluid pressure source means where the fluid is either recirculated or lost to the ambient around the robotics manipulator 10.

Each of the fluid channel means or pipes 30 and 31 have mounted in them transducers 46 and 47. These transducers are small solid-state types of transducers well-known in the art and can be either flow responsive or pressure responsive. A group of conductors are shown leading from each of the sensors 46 and 47, as at 48 and 49. The conductors 48 and 49 are connected to transducer means 50 and 51 which convert the pressure or flow in the fluid channel means 30 and 31 into an electrical output signal on conductors 52 and 53. The conductors 52 and 53 feed back to a control means 54 that has an input at 55. The input at 55 is the command to the robotics manipulator 10 indicating whether the manipulator is to open or close, and this signal is varied by the electrical signals from the conductors 52 and 53 which in turn are responsive to the fluid flow or pressure in the channel means 30 and 31. Each of the transducer means 50 and 51 is connected to a source of power generally disclosed at 56 and 57. This could be a common source of power, but have been shown separate for convenience.

While the present system has been shown as containing two variable fluid flow restriction means 34 and 35, it is quite apparent that the system would be functional with only one of the two variable fluid flow restriction means being present. The gripping force of the robotics manipulator 10 on an object, such as a plate, would generate an output signal in one of the sensors 46 or 47 (if only one were present) and this signal could be used for operating the control means 54. The use of two variable fluid flow restriction means allows a more sophisticated or sensitive type of manipulator.

Figure 2:
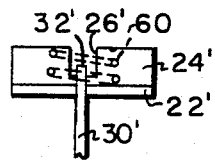
FIG. 2 is a modified form of a variable flow restriction means.
Figure 3:
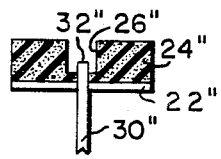
FIG. 3 is a further modification of the variable flow restriction means.

In FIGS. 2 and 3 two variations of the variable fluid flow restriction means are shown. A channel means or pipe 30' is again disclosed through a plate 22' to a pad 24'. The pad 24' contains an embedded spring 60 that encircles an opening 26' around the end 32' of the channel means 30'. The spring 60 provides a characterizing force within the pad 24' and allows the variable fluid flow restriction means disclosed in FIG. 2 to have a characterized force versus pressure function on the fluid flow in the channel 30'.

In FIG. 3 a further variation is disclosed with a channel means 30'' disclosed through a mounting plate 22'' to a pad 24''. The pad 24'' has an opening 26'' and the end 32'' of the channel means 30'' is disclosed. The pad 24'' is of a porous material and when compressed against an object, this porous pad acts as a plurality of orifices that are restricted thereby changing the fluid flow characteristics of the variable fluid flow means.

In addition to the types of variable flow restriction means disclosed in FIGS. 1 to 3, it would be possible to structure the variable fluid flow restriction means as one which was basically closed when not gripping an object, and which is progressively opened as the object is engaged. Such a structure could be in the form of a bladder or similar structure with a slit that progressively is increased in an open dimension as the bladder contracts against an object. This type of structure has not been specifically disclosed, but is encompassed in the generic concept of the present invention.

A robotics manipulator having a control system that allows for controlling the gripping force of the manipulator on an object has been disclosed. A number of variations have been specifically set out, and it is apparent that other variations would be well within the generic concept provided. The applicant wishes to be limited in the scope of his invention solely by the scope of the appended claims.

The embodiments of the invention in which an exclusive property or right is claimed are defined as follows:

1. A robotics manipulator having a control system allowing said manipulator to be controlled with respect to a gripping force on an object, including: robotics manipulator means having at least two members that move relative to each other to provide a gripping force at a predetermined location; said manipulator means including control means; fluid pressure source means including connection means connected to fluid channel means; said fluid channel means having opening means in at least one of said two members near said predetermined location; variable fluid flow restriction means attached to said manipulator means with said variable fluid flow restriction means changing in fluid flow restriction characteristics as said two members increase said gripping force at said predetermined location upon said manipulator means gripping said object; said fluid flow restriction means changing the fluid flow and changing a fluid condition in said fluid channel means; transducer means responsive to said changing fluid condition in said channel means; and said transducer means connected to said manipulator control means to feed back a signal indicative of said gripping force.

2. A robotics manipulator as described in claim 1 wherein said variable fluid flow restriction means increases in fluid flow restriction characteristics.

3. A robotics manipulator as described in claim 2 wherein said restriction means includes said opening means encircled by said variable fluid flow restriction means which further includes a pliable pad which compresses against said object to cause said increase in fluid flow restriction characteristics.

4. A robotics manipulator as described in claim 3 wherein said opening means and said variable fluid flow restriction means are mounted upon said robotics manipulator means gripping members by joint means that allow said opening means and said variable fluid flow restriction means to freely align said fluid flow restriction means with said object to be gripped.

5. A robotics manipulator as described in claim 4 wherein said pliable pad includes spring means to control the compression of said pad to in turn control said fluid flow restriction characteristics.

6. A robotics manipulator as described in claim 5 wherein said fluid pressure source is a source of air.

7. A robotics manipulator as described in claim 4 wherein said pliable pad is fabricated of a porous material which varies in fluid flow characteristics as said pad is compressed against said object to be gripped.

8. A robotics manipulator as described in claim 6 wherein said fluid pressure source is a source of air.

9. A robotics manipulator as described in claim 1 wherein said two members that move relative to each other each having a fluid flow channel means including opening means near said predetermined location; each of said two members having variable fluid flow restriction means attached to said manipulator means with each of said variable fluid flow restriction means changing in fluid flow restriction characteristics as said two members increase said gripping force at said predetermined location; and said transducer means including a separate transducer in each of said channel means.

10. A robotics manipulator as described in claim 9 wherein said variable fluid flow restriction means increase in fluid flow restriction characteristics.

11. A robotics manipulator as described in claim 10 wherein each of said restriction means includes said opening means encircled by said variable fluid flow restriction means which further includes a pliable pad which compresses against said object to cause said increase in fluid flow restriction characteristics.

12. A robotics manipulator as described in claim 11 wherein each of said opening means and said variable fluid flow restriction means are mounted upon said robotics manipulator means gripping members by joint means that allow said opening means and said variable fluid flow restriction means to freely align said fluid flow restriction means with said object to be gripped.

13. A robotics manipulator as described in claim 12 wherein said pliable pads include spring means to control the compression of said pads to in turn control said fluid flow restriction characteristics.

14. A robotics manipulator as described in claim 13 wherein said pliable pads are fabricated of a porous material which varies in fluid flow characteristics as said pads are compressed against said object to be gripped.

15. A robotics manipulator as described in claim 14 wherein said fluid pressure source is a source of air.

16. A robotics manipulator as described in claim 13 wherein said fluid pressure source is a source of air.

* * * * *